United States Patent
Ovadia

(10) Patent No.: US 12,238,464 B2
(45) Date of Patent: Feb. 25, 2025

(54) REMOTE CONFIGURATION AND MONITORING OF SMART AMPLIFIERS IN CABLE SYSTEMS

(71) Applicant: Charter Communications Operating, LLC, St. Louis, MO (US)

(72) Inventor: Shlomo Ovadia, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 62 days.

(21) Appl. No.: 18/322,711

(22) Filed: May 24, 2023

(65) Prior Publication Data

US 2024/0397240 A1 Nov. 28, 2024

(51) Int. Cl.
*H04Q 9/00* (2006.01)

(52) U.S. Cl.
CPC .......... *H04Q 9/00* (2013.01); *H04Q 2209/30* (2013.01)

(58) Field of Classification Search
CPC .. H04Q 9/00; H04Q 2209/00; H04Q 2209/10; H04Q 2209/30; H04Q 2209/40; H04Q 2209/70; H04Q 2209/80; H04Q 2209/84; H04Q 2209/86
See application file for complete search history.

(56) References Cited

U.S. PATENT DOCUMENTS

| | | | |
|---|---|---|---|
| 9,595,923 B2* | 3/2017 | Nobbe | H03F 1/3223 |
| 9,712,815 B2* | 7/2017 | Bronkhorst | H04N 17/004 |
| 11,122,339 B1 | 9/2021 | Cook | |
| 11,558,757 B2* | 1/2023 | Hatamian | H04B 7/0617 |
| 2014/0192849 A1* | 7/2014 | Terry | H04W 52/245 375/259 |
| 2021/0306175 A1 | 9/2021 | Aguirre et al. | |
| 2022/0109918 A1 | 4/2022 | Cook | |

* cited by examiner

*Primary Examiner* — Franklin D Balseca
(74) *Attorney, Agent, or Firm* — Young Basile Hanlon & MacFarlane, P.C.

(57) ABSTRACT

Methods and systems for monitoring, reporting, and managing operational status and configuration of a smart amplifier which includes a radio frequency amplifier unit and transponder. A smart amplifier includes a radio frequency (RF) amplifier unit, a transponder including a transponder component integrated with a telemetry agent, and a controller. The RF amplifier unit configured to process a signal received via a cable access network. The transponder is configured to collect telemetry data from the received signal and stream the collected telemetry data to a service processing platform. The controller configured to remotely configure the RF amplifier unit based on information received from the service provider processing platform, the information based on the streamed telemetry data.

20 Claims, 11 Drawing Sheets

REMOTE CONFIGURATION AND MONITORING OF SMART AMPLIFIERS IN CABLE SYSTEMS

TECHNICAL FIELD

This disclosure relates to remote management and telemetry of radio frequency (RF) amplifier units deployed in or on a cable system. More specifically, a transponder component with a smart telemetry agent is integrated with or added to a RF amplifier unit to monitor, report, and manage operational status and configuration of the RF amplifier unit.

BACKGROUND

Service providers provide data, voice, video, Internet, and other services (collectively "services") to its customers through an extensive network of coaxial cables and radio frequency (RF) amplifiers (collectively a "coaxial network") that serve millions of residential subscribers and small-medium size businesses using different types of access devices including, but not limited to, D3.1 embedded multimedia terminal adapter (eMTA), advanced wireless gateway (AWG), and 1/10G Ethernet passive optical network (EPON) optical network unit (ONU). The coaxial network is typically built with cascaded RF trunk and distribution amplifiers using a tree- and branch architecture. There are, however, operational issues with the coaxial network and the RF amplifiers deployed in or on the coaxial network. These issues can include, but are not limited to, no or limited information on the operational status of the RF amplifiers, no downstream or upstream spectral information from the RF amplifiers, and no information on Diplexer filter configurations in the RF amplifiers. Issues with respect to the operational and functional capabilities of the RF amplifiers can limit or impact the performance, efficiency, functionality, and/or usability of a service provider network, which includes the coaxial network, to provide services to its customers.

SUMMARY

Disclosed herein is a smart radio frequency (RF) amplifier unit enabled to monitor, report, and manage operational status and configuration of the RF amplifier unit. In implementations, a smart amplifier includes a radio frequency (RF) amplifier unit, a transponder which includes a transponder component and a telemetry agent, and a controller. The RF amplifier unit configured to process a signal received via a cable access network. The transponder configured to collect telemetry data from the received signal and stream the collected telemetry data to a service provider processing platform. The controller configured to remotely configure the RF amplifier unit based on information received from the service provider processing platform, the information based on the streamed telemetry data.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
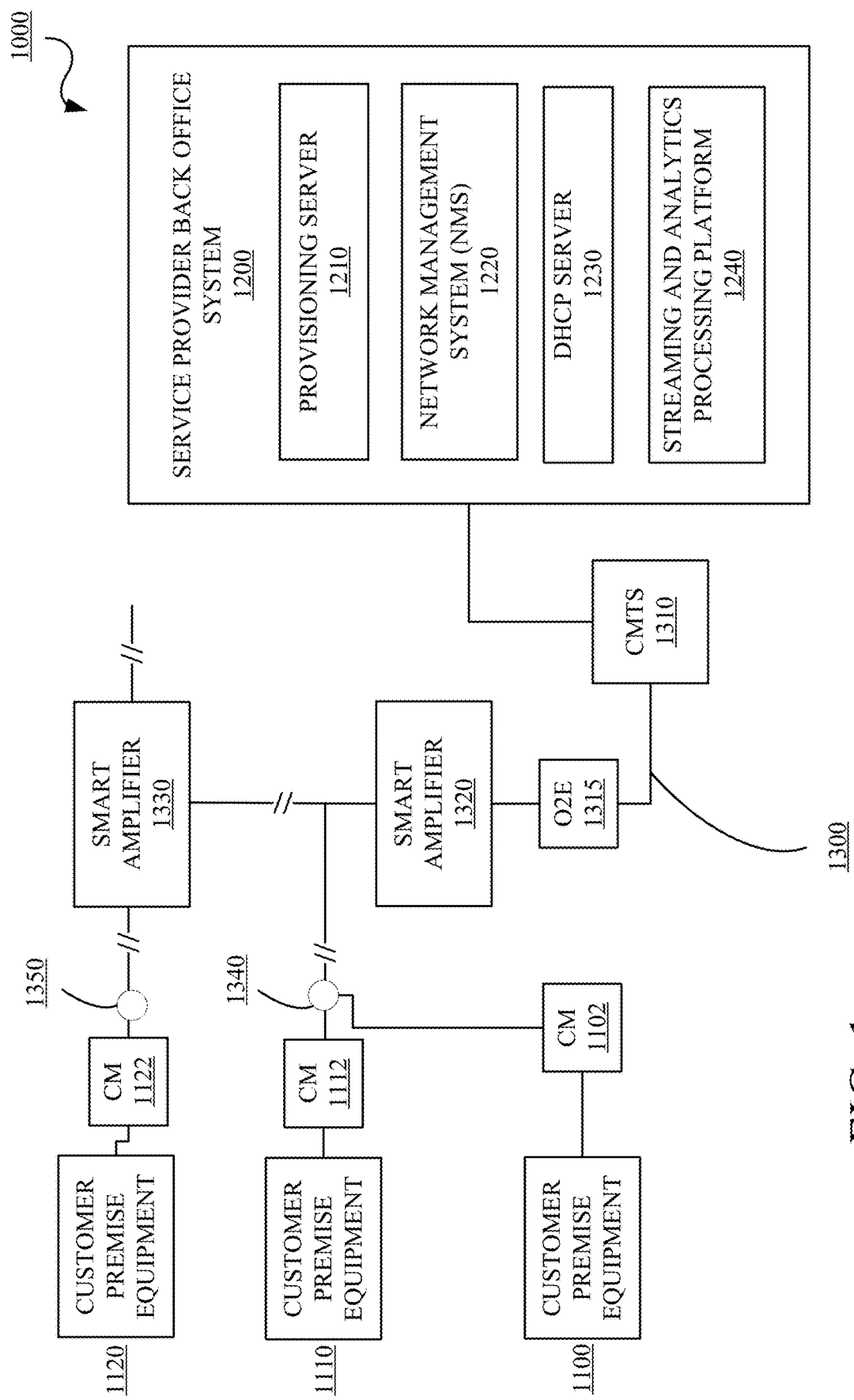
FIG. 1 is a diagram of an example of a network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for remote management of smart amplifiers with include a radio frequency (RF) amplifier units and a transponder to capture and stream telemetry data, monitor, report, and manage operational status and configuration of the smart amplifier and RF amplifier unit, where the transponder is a transponder component integrated with a telemetry agent. Remote management provides cost effective and minimizes truck rolls to diagnose and resolve the cable fault issues. It provides a non-intrusive method to detect and analyze the type and location of a cable fault in near real time. Machine Learning Model (MLM) algorithms and/or platforms can be used to provide proactive action based on the identified cable fault type and location. The MLM algorithms and/or platforms can be adaptive and flexible to include other cable fault components and conditions such as weather-related issues. The smart amplifier enables addition of new functional capabilities using the capabilities of the transponder and controller. Real-time and/or latest operational status and performance of the smart amplifiers can be obtained. This data can be used to provide real-time cable plant diagnostics by analyzing the streaming telemetry data from various coaxial cable trunks with cascaded amplifiers.

FIG. 1 is a diagram of an example network architecture 1000. The network architecture 1000 can include customer premises equipment (CPE) 1100, 1110, and 1120, a service provider back-office system 1200, a hybrid fiber-coaxial cable (HFC), a coaxial cable system, and/or combinations thereof (collectively "cable system") 1300, a cable modem termination system (CMTS) 1310, smart amplifiers 1320 and 1330, and taps 1340 and 1350. The CPEs 1100, 1110, and 1120 are connected to or in communication with (collectively "connected to") the service provider back-office system 1200 via the cable system 1300 using the taps 1340 and 1350, the smart amplifiers 1320 and 1330, and the CMTS 1310, as appropriate and applicable. The CPEs 1100 and 1110 are connected to the tap 1340, which in turn is connected to the smart amplifier 1320, the CMTS 1310, and the service provider back-office system 1200. The CPE 1120 is connected to the tap 1350, which in turn is connected to the smart amplifier 1330, the smart amplifier 1320, the CMTS 1310, and the service provider back-office system 1200. The number of components shown herein are illustrative and there may be more or less in the network architecture 1000. The network architecture 1000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The CPEs 1100, 1110, and 1120 can be routers, set-top boxes, and the like which provides connectivity including Internet connectivity, wired connectivity, wireless connectivity, data, voice over IP, and combinations thereof. The CPEs 1100, 1110, and 1120 can be deployed, for example, at a customer premises, residences, offices, and the like.

The service provider back-office system 1200 can include multiple components to provide services to customers via the CPEs 1100, 1110, and 1120. The service provider back-office system 1200 can include service provider servers, networks, or clouds including, but not limited to, a provisioning server 1210, a network management system (NMS) 1220, a Dynamic Host Configuration Protocol (DHCP) server 1230, and a streaming and analytics processing or service provider processing platform and/or server 1240. The provisioning server 1210 can provide configuration information and data to components in the network architecture 1000 including, for example, the CPE 1100, 1110, and 1120. The configuration information and data enable operation of the CPE 1100, 1110, and 1120. The NMS 1220 can include applications which monitor, maintain, and optimize a network. The DHCP server 1230 can manage Internet Protocol (IP) addresses it allocates to network nodes.

The streaming and analytics processing or service provider processing platform and/or server 1240 can receive the streamed telemetry data from the smart amplifiers 1320 and 1330, analyze the streamed telemetry data to determine issues and/or impairments, isolate components potentially causing the issues, and send instructions, as appropriate and applicable, to correct certain issues. The streaming and analytics processing or service provider processing platform and/or server 1240 can include, but is not limited to, the components described herein with respect to streaming and analytics processing platform and/or server 1640 in FIG. 1A.

The CMTS 1310 can provide cable, television, Internet, voice, and like services to the CPEs 1100, 1110, and 1120. The CMTS 1310 can communicate via an optical-to-electrical (O2E) converter 1315 (also known as a fiber node) with the smart amplifiers 1320 and 1330 and the service provider back-office system 1200 with respect to telemetry data and configuration instructions.

The smart amplifiers 1320 and 1330 can be a RF amplifier unit with a controller and a transponder component integrated with a smart telemetry agent to monitor and report the operational status of the RF amplifier unit in the cable plant to the service operator's streaming and analytics processing or service provider processing platform 1240 and are further described with respect to FIGS. 2-5. The smart amplifiers 1320 and 1330 can provide operational intelligence to the service operator's streaming and analytics processing or service provider processing platform 1240, which can be used to optimize the RF amplifier unit performance for a specific cable network in a specific geographical area, for example.

The taps 1340 and 1350 are used to connect premises, which include the CPEs 1100, 1110, and 1120 connected to cable modems (CM) 1102, 1112, and 1122, respectively, to the cable system 1300. In implementations, the CMs 1102, 1112, and 1122 can be or include voice gateways and an internal or external battery, cable modems, and/or Embedded Multimedia Terminal Adapters (eMTAs).

Figure 1A:
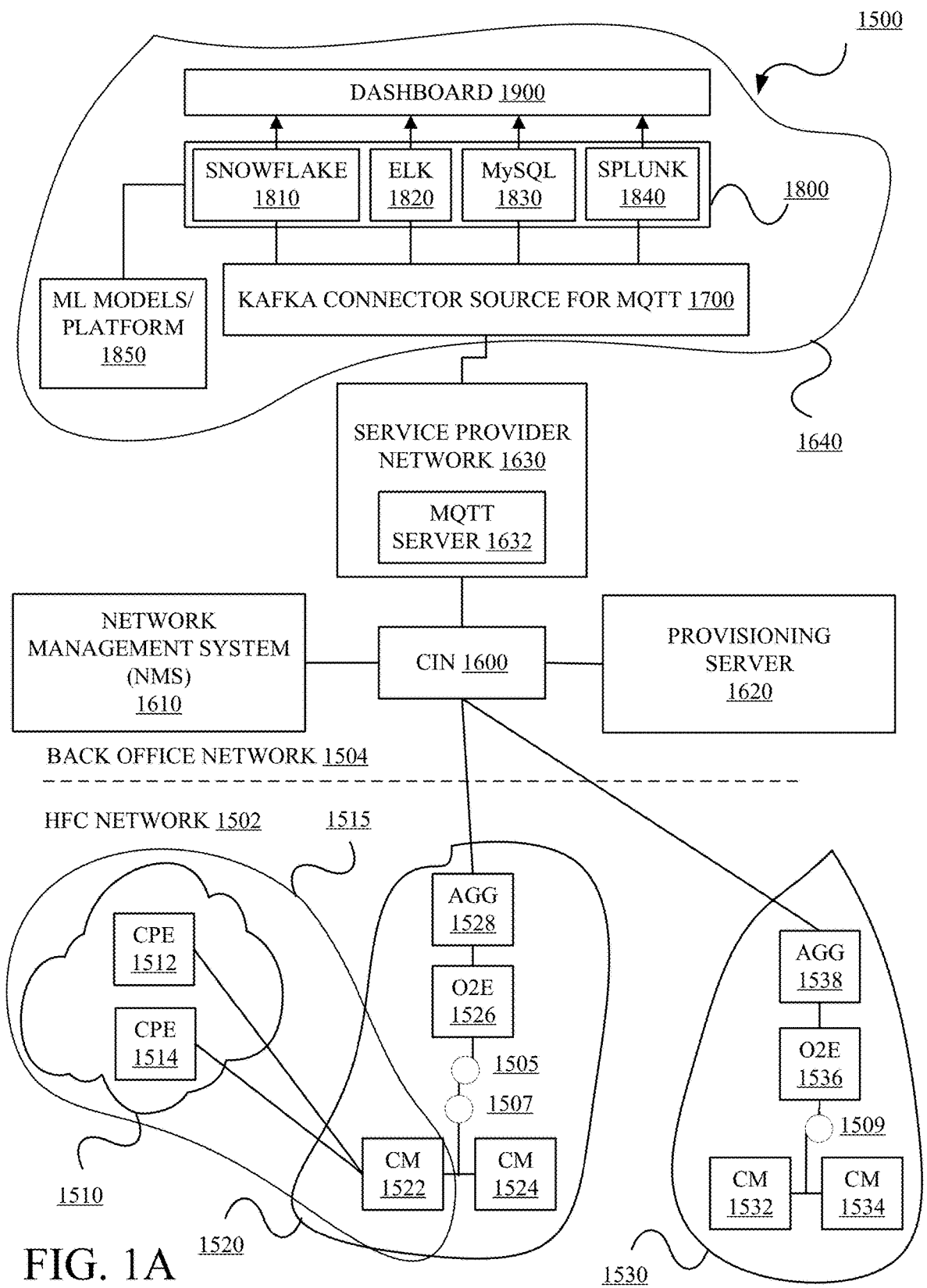
FIG. 1A is a diagram of an example of a network architecture in accordance with embodiments of this disclosure.

FIG. 1A is a diagram of an example network architecture 1500. The network architecture 1500 can include one or more CPEs 1512 and 1514 deployed on a local area network (LAN) 1510 and connected to network components 1520 in a hybrid fiber-coaxial (HFC) network or cable network 1502. The HFC network 1502 can include any number of smart amplifiers 1505, 1507, and 1509, and any number of network components including, but not limited to, network components 1520 and 1530. In implementations, the HFC network 1502 may terminate at cable modem, such as CM 1522, 1524, 1532, and 1534. As such, the CPEs 1512 and 1514 and the CM 1522, for example, form a home network 1515. The network components 1520 and 1530 can be connected to a converged interconnect network (CIN) 1600 in a service provider's back-office network 1504. The service provider's back-office network 1504 can include, but is not limited to, a NMS 1610, a provisioning system 1620, a service provider cloud network 1630, and a service operator's streaming and analytics processing or service provider processing platform 1640. The network architecture 1500 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The smart amplifiers 1505, 1507, and 1509 can be a RF amplifier unit with a controller and a transponder component integrated with a smart telemetry agent to monitor and report the operational status of the RF amplifier unit in the cable plant to the service operator's streaming and analytics processing or service provider processing platform 1640 and are further described with respect to FIGS. 2-5. The smart amplifiers 1505, 1507, and 1509 can provide operational intelligence to the service operator's streaming and analytics platform 1640, which can be used to provide information, instructions, and/or commands to the controller to optimize the RF amplifier unit performance for a cable network in a specific geographical area, for example. In implementations, RF amplifier unit configuration files can be sent to the controller to fine tune the various amplifier stages' components as described with respect to FIGS. 5 and 6.

The CPEs 1512 and 1514 can be routers, set-top boxes, and the like which provides connectivity including Internet connectivity, wired connectivity, wireless connectivity, data, voice over IP, and combinations thereof. The CPEs 1512 and 1514 can be deployed, for example, at a customer premises, residence, office, and the like.

The provisioning server 1610 can provide configuration information and data to components in the network architecture 1500 including, for example, the CPEs 1512 and 1514. The configuration information and data enable operation of the CPEs 1512 and 1514. The NMS 1610 can include applications which monitor, maintain, and optimize a network.

The network components 1520 and 1530 can include, but are not limited to, cable modems (CM) 1522, 1524, 1532, and 1534, optical-to-electrical (O2E) converters 1526 and 1536, and aggregators 1528 and 1538, respectively. The aggregators 1528 and 1538 can be, for example, a CMTS or a Converged Cable Access Platform (CCAP), or virtual CMTS (vCMTS). In implementations, the CMs 1522, 1524, 1532, and 1534 can include a voice gateway and external battery backup (EBBU) in case of external power failure, cable modems, and/or Embedded Multimedia Terminal Adapters (eMTAs).

The service operator's streaming and analytics processing or service provider processing platform 1640 can include, but is not limited to, a Kafka connector source for the MQTT server 1700 which is connected to data analytics tools 1800, which in turn is connected to a dashboard 1900 for displaying results. The data analytics tools 1800 can include, but is not limited to, a SnowFlake component 1810, an ELK component 1820, a MySQL component 1830, and a SPLUNK component 1840. A Machine Learning Model (MLM) or platform 1850 may be used to parse the received telemetry data, recognize patterns, and provide predictions to the data analytics tools 1800. The MLM platform 1850 is further described with respect to FIG. 8. The dashboard 1900 can be a multi-platform open-source analytics and interactive visualization web application that users may customize to create complex monitoring dashboards.

In some embodiments, the service provider cloud network 1630 can include a message queuing telemetry transport (MQTT) server 1632 that is configured to support various forms of authentication and/or various data security mechanisms (e.g., using a script to generate security certificates). In some embodiments, the service provider cloud network 1630 can be an OpenSync™ Cloud that is configured to provide the operator with various command and control services, including network status, IP address, network mask, DHCP status, parental control, speed test initiation and results, reset and reboot device, etc. The service operator's streaming and analytics platform 1640 can be a computing system that includes one or more computing devices in a centralized or distributed architecture.

Figure 2:
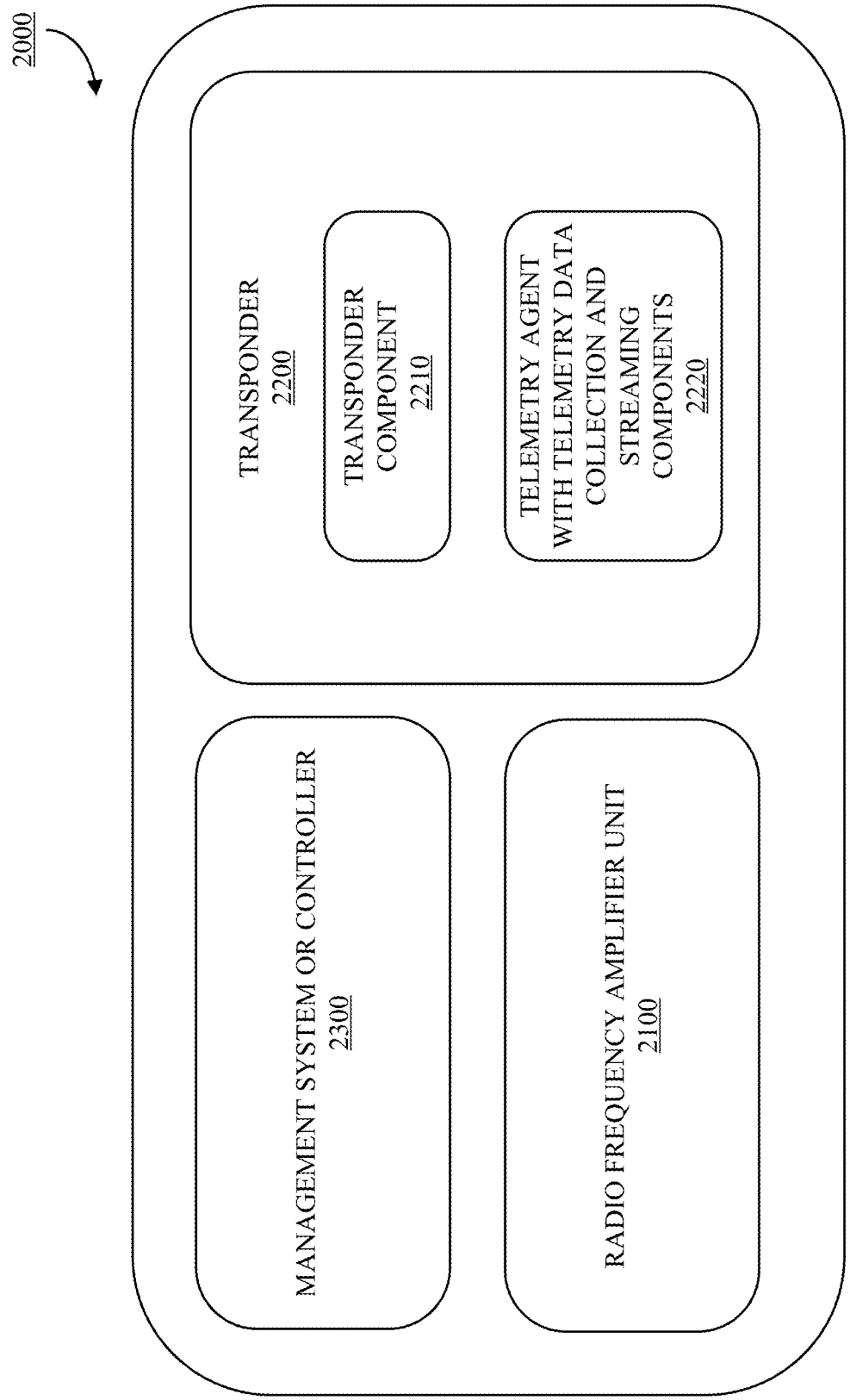
FIG. 2 is a block diagram of an example of a smart RF amplifier in accordance with embodiments of this disclosure.

FIG. 2 is a block diagram of an example smart amplifier 2000 in accordance with embodiments of this disclosure. In implementations, the smart amplifier 2000 can be the smart amplifiers 1320, 1330, 1505, 1507, and 1509 as shown in FIGS. 1 and 1A. The smart amplifier 2000 can include, but is not limited to, a RF amplifier unit 2100, a transponder 2200, and a management system and/or controller 2300. The smart amplifier 2000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The management system and/or controller 2300 can include an information model for the RF amplifier unit 2100, electronically control various components in the RF amplifier unit 2100 as well as interact with the transponder 2200 to execute specific test scripts to obtain up-to-date operational status and performance of the RF amplifier unit 2100 in the field and/or provide instructions or commands to remotely configure the RF amplifier unit 2100. The management system and/or controller 2300 may include an interface, such as a digital interface to the transponder 2200. In implementations, the instructions or commands can be based on the up-to-date operational status and performance data and the streamed telemetry data as described herein. In addition, the management system and/or controller 2300 can provide remote control capabilities with the service provider back office in terms of day-to-day operation, remote diagnostic, monitoring, and security capabilities. Local management of the amplifier can be conducted by adding a wireless transceiver (not shown) that can be plugged into a local management interface in the smart amplifier 2000. In implementations, the local management access interface can be disabled remotely for security reasons. In implementations, the management system and/or controller 2300 may be a low-cost digital signal processor running a Linux operating system (OS).

Figure 5:
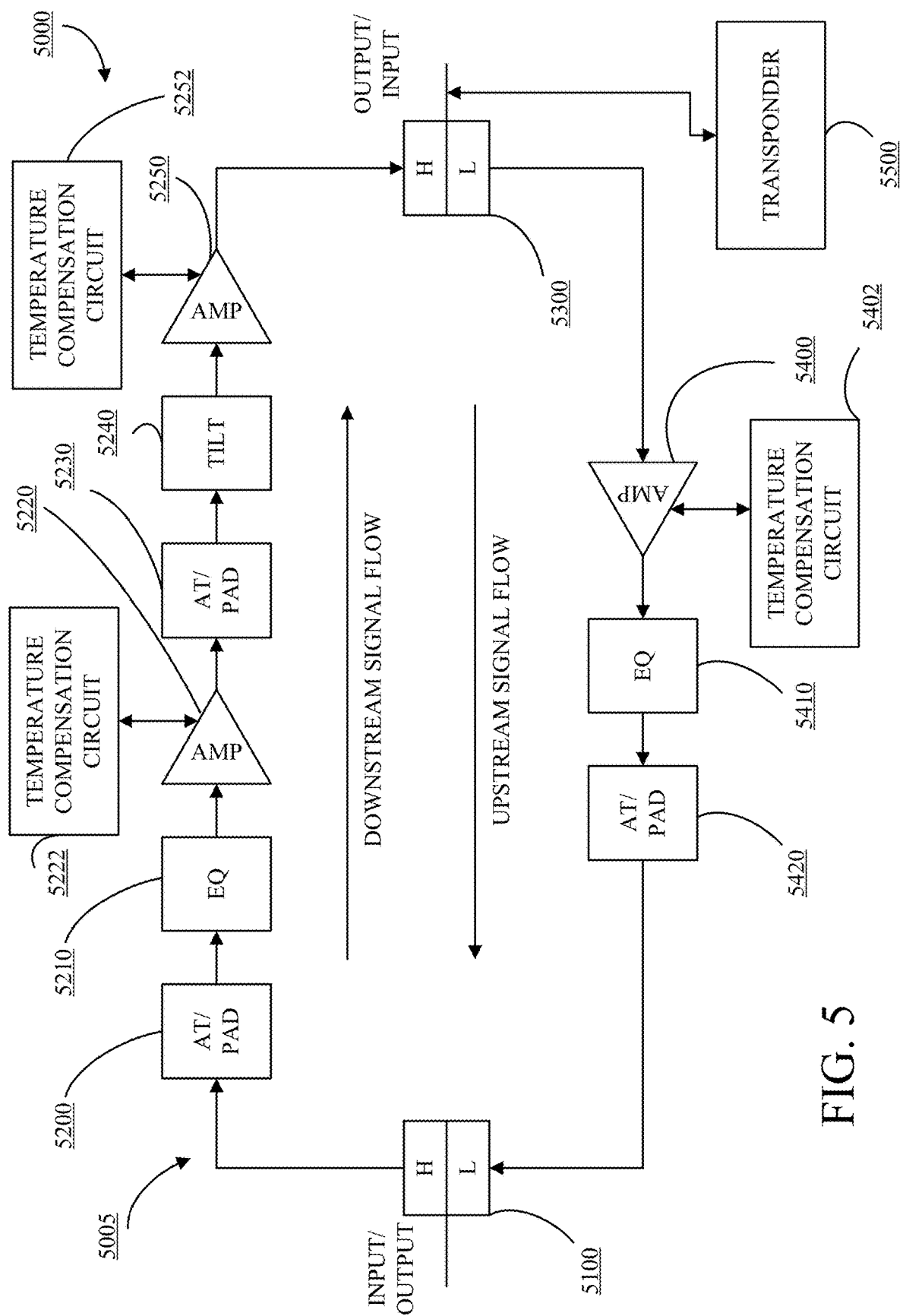
FIG. 5 is a block diagram of an example of a smart RF amplifier in accordance with embodiments of this disclosure.

The RF amplifier unit 2100 can be a two-port RF amplifier with multiple attenuation, equalization, tilt, and amplifier stages as shown in FIG. 5. The RF amplifier unit 2100 can be trunk and distribution RF amplifiers. The RF amplifier unit 2100 can process signals received over a cable network in either an upstream signal flow or downstream signal flow. The signals can be, for example, content signals, data signals, instruction signals, and the like.

The transponder 2200 can include, but is not limited to, a transponder component 2210 integrated with a smart telemetry agent 2220, which can collectively collect and stream telemetry data to a service operator's streaming and analytics processing or service provider processing platform for impairment detection, fault analysis, operational analysis, and the like. In implementations, the transponder 2200 may collect telemetry data including but not limited to, the RF amplifier's metrics such as the temperature, equalization coefficients, and gain parameters for each amplifier stage. The streaming telemetry data sent by the transponder 2200 (e.g., the smart telemetry agent 2220), can be analyzed by the service provider streaming and analytics processing or service provider processing platform to assess not only the specific amplifier status and performance, but also to assess the cable plant or cable network conditions, particularly for a coaxial cable trunk with cascaded amplifiers, and their impact on a customer's quality of experience (QoE).

The transponder 2200 location in the service provider's HFC or cable network is important for remote diagnostic of field issues. The transponder 2200 are typically cascaded on the coaxial cable between a fiber node and a coaxial tap as shown for example in FIG. 1. The operation and performance of each RF amplifier unit 2100 depends on many factors such as the type and model of the amplifier, the location of the amplifier on the cascaded link, the distance between the nearest neighbor amplifiers, underground or aerial amplifier location, and weather conditions in the local area. In implementations, the transponder 2200 can include or embed Global Positioning System (GPS) capabilities or functionality in the transponder 2200 for providing a location of the integrated transponder 2200 as deployed in the cable network. In implementations, the transponder 2200 can add a location management information base (MIB) object. In this instance, location or information model MIB objects can be defined for a transponder management system.

In implementations, the controller 2300 has information data model objects (read-only objects), which are organized in tree-like structures, to identify the specific amplifier such the amplifier model number, serial number, amplifier's description, name, vendor OUI (3-byte hex-binary string that contains the IEEE Company Identifier for the vendor), current software version, and/or hardware version. Other information data model objects (read/write) provides system configuration information, amplifier geographical location, reset capabilities to support different type of reset, reset control and management, and various event logs and notifications. Depending on the data types, the data models can use either SNMP MIBs, XML schemas, or YANG (Yet Another Next Generation) data model modules, which has a hierarchical data structure, with NETCONF or RESTCONF configuration protocols, to manage the amplifier configuration and to automate the operation in the field.

In implementations, the transponder 2200 can be a cable modem (a transponder component), such as an OpenWrt D4.0/D3.1 cable modem, which is integrated with a smart telemetry agent to monitor and report the operational status of the RF amplifier unit 2100 to the service operator's streaming and analytics processing or service provider processing platform. The cable modem can provide a range of telemetry data, including but not limited to, downstream (DS) and upstream (US) RF spectrum capture, DS and US RF spectrum capture to detect co-channel interference due to LTE signals in the downstream and ingress noise in the upstream direction, DS and US channel parameters including received and transmitted power per channel, DS Orthogonal frequency-division multiplexing (OFDM) channel's receiver modulation error ratio (R×MER) per subcarrier to identify, for example, over-the-air UHF ingress interference in LTE 4G and 5G bands, orthogonal frequency division multiple access (OFDMA) channel's impulse response and group delay to identify, for example, cable plant signal distortions due to the changes in the RF amplifier operation, switchable diplexer configuration, and data over cable service interface specification (DOCSIS) and Syslogs.

In implementations, the transponder 2200 can be a Full Band Capture (FBC) receiver or modem (collectively "FBC device") (a transponder component) with a smart telemetry agent to stream captured spectrum telemetry data to the service operator's streaming and analytics processing or service provider processing platform. The FBC device can provide a spectrum analyzer capability or component at a low-cost in contrast to the cable modem. The FBC device can provide a low-cost discrete Fourier transform (DFT) and fast Fourier transform (FFT)-based technology to support spectrum analyzer-like functionality that is found in many DOCSIS 3.0 and all DOCSIS 3.1 cable modems.

Figure 3:
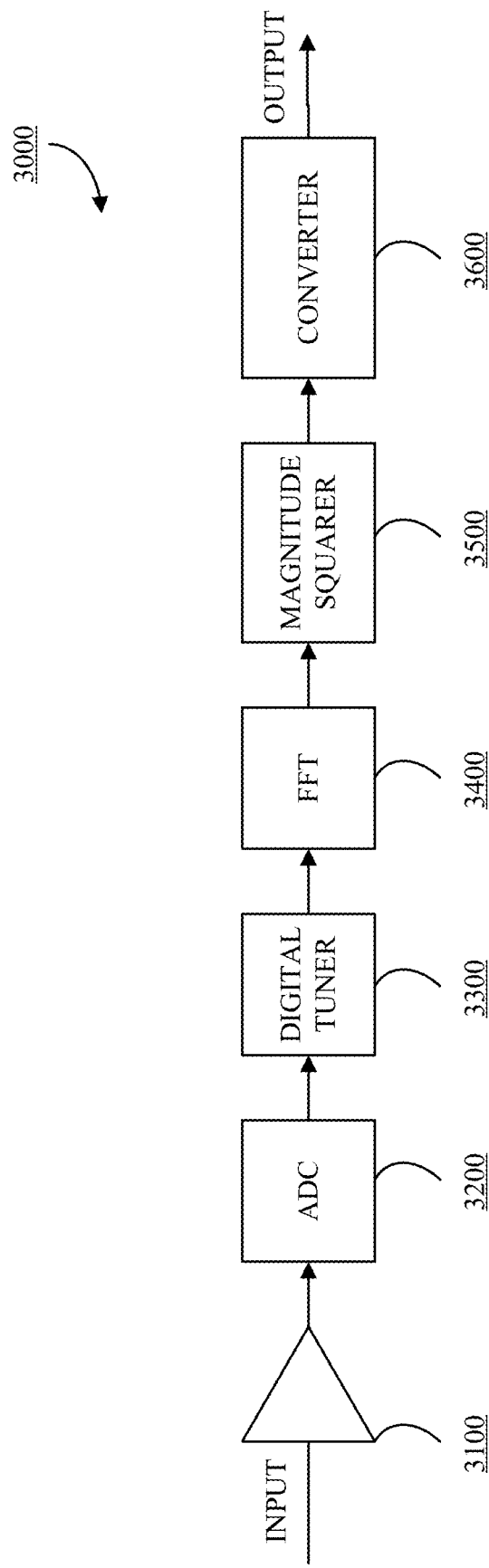
FIG. 3 is a block diagram of an example of a digital spectrum analyzer.

FIG. 3 is a block diagram of an example of a digital spectrum analyzer 3000. The digital spectrum analyzer 3000 can include, but is not limited to, an analog front end 3100, an analog-to-digital converter (ADC) 3200, a digital tuner 3300, a fast Fourier transform (FFT) component 3400, a squarer component 3500, and a converter 3600. The digital spectrum analyzer 3000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

An input signal, which is a full upstream or downstream band from the cable network, is input to the analog front end 3100. The analog frontend 3100 amplifies the signal and provides RF gain control. The ADC 320, which can be a high-speed broadband ADC, provides digital samples of the signal from the analog frontend 3100. The digital tuner 3300, which can include a digital oscillator and lowpass filter, selects the desired analysis band around a specified center frequency. The signal from the selected band is applied to the FFT 3400, which multiplies the signal by a DFT matrix. Each bin of the FFT output comprises a complex value consisting of two numbers, real (I) and imaginary (Q), giving the correlation of the input signal with a particular frequency corresponding to a single row of the DFT matrix. Typically, a spectrum analyzer is only concerned with the magnitude, not the phase, of the FFT output. As such, the squarer 3500 computes the power (magnitude-squared) of each bin, i.e., $I^2+Q^2$ for each bin. If spectrum smoothing is to be applied, the previously described process is repeated with a fresh set of data from the same band, and the power values from several captures are averaged at each bin location. The converter 3600 converts the smoothed bins to decibels by taking 10*log 10 of each bin power value. The decibel values can be used for analysis by components in a service operator's streaming and analytics processing or service provider processing platform. If the entire band is able to be processed as a single analysis band, then the digital tuner 3300 is not needed.

Figure 4:
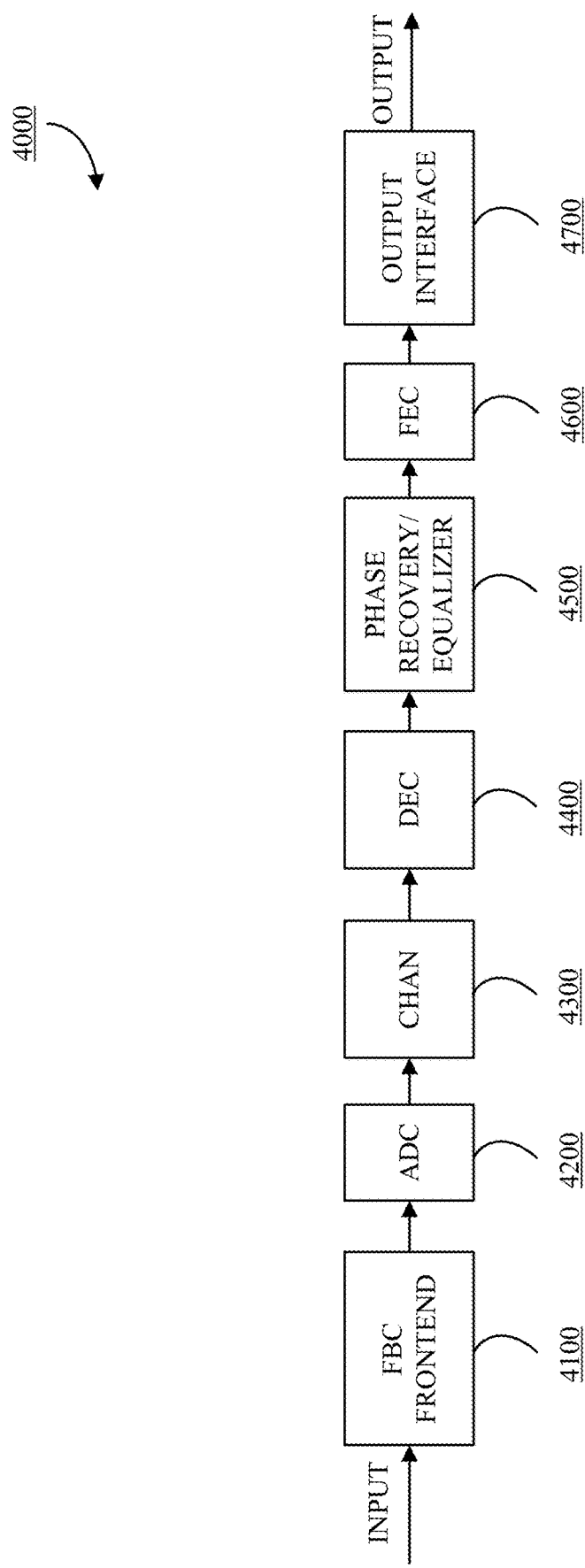
FIG. 4 is a block diagram of an example of a full band capture receiver for use as a transponder component in accordance with embodiments of this disclosure.

FIG. 4 is a block diagram of an example of a full band capture (FBC) receiver 4000 for use as a transponder component in accordance with embodiments of this disclosure. The full band capture receiver 4000 can include, but is not limited to, a FBC frontend 4100, an N-bit ADC 4200, a channelizer 4300, a variable decimator 4400, a phase recovery/equalizer 4500, a forward error correction (FEC) encoder 4600, and output interface 4700. The FBC receiver 4000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The FBC frontend 4100 consists of a direct sampling analog frontend to digitize the downstream signal using the N-bit ADC 4200. In implementations, N is 12 bits or higher. The channelizer 4300 selects the desired frequency range for processing the signal via the variable decimator 4400, the phase recovery/equalizer 4500, and the forward error correction (FEC) encoder 4600 and outputting via the output interface 4700 for spectral analysis. The output interface provides a serial output of the sampled data. Instead of using Simple Network Management Protocol (SNMP) to remotely access the FBC spectrum, the low-cost FBC receiver 4000 may include or be integrated with a smart and efficient telemetry agent (as shown in FIG. 2 as the transponder 2200) to stream the FBC spectrum data to the service provider's streaming and analytics processing or service provider processing platform to detect cable faults from the field-deployed amplifiers.

FIG. 5 is a block diagram of an example of a smart RF amplifier 5000 in accordance with embodiments of this disclosure. The smart RF amplifier 5000 can be the smart amplifiers 1320, 1330, 1505, 1507, 1509, and 2000. The smart RF amplifier 5000 is a smart two-port RF amplifier configuration with multiple stages, collectively RF amplifier unit 5005, integrated with a transponder 5500 such as an OpenWrt D4.0/D3.1 modem with streaming telemetry or a FBC receiver running on a processor with an integrated streaming telemetry agent. The smart RF amplifier 5000 can include, but is not limited to, a diplex filter 5100 connected to a diplex filter 5300 via a downstream signal flow or path and an upstream signal flow or path. The downstream signal flow can include multiple stages which can include, but is not limited to, an attenuator 5200, an equalizer 5210, an amplifier 5220, an attenuator 5230, a tilt component 5240, and an amplifier 5250. In implementations, the amplifier 5220 can be connected to a temperature compensation circuit 5222 and the amplifier 5250 can be connected to a temperature compensation circuit 5252. The upstream signal flow can include multiple stages which can include, but is not limited to, an amplifier 5400, an equalizer 5410, and an attenuator 5420. In implementations, the amplifier 5400 can be connected to a temperature compensation circuit 5402. A transponder 5500 can be connected to one end or port of the smart RF amplifier 5000. The smart RF amplifier 5000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

In implementations, the attenuator 5200, the equalizer 5210, the amplifier 5220, the attenuator 5230, the tilt component 5240, the amplifier 5250, the amplifier 5400, the equalizer 5410, and the attenuator 5420 can be controlled and/or configured by a controller such as the controller 2300, which can be connected to the transponder 5500. Configuration of each stage needs to use the values within the operating range of the stage component, i.e., the attenuator, the equalizer, the amplifier, and/or the tilt component.

Operationally, a transmitted downstream signal (from a cable network) enters the smart RF amplifier 5000 and is directed along the downstream signal flow by the diplex filter 5100, which filters a downstream signal component (H) and an upstream signal component (L). The attenuator 5200 ensures the signal level is in the optimal range for the preamplifier gain stages (i.e., the amplifier 5220 and the amplifier 5250) and the equalizer 5210 removes any frequency tilt remaining in the signal after traversing the cable network and passives in a previous network segment. Interstage attenuation (i.e., the attenuator 5230) controls the output level, while slope control (i.e., the tilt component 5240) sets the output tilt. The signal then goes through the diplex filter 5300 to be reunited with the upstream signal and exits the smart RF amplifier 5000. In the upstream signal flow, the signal flow is simpler, as losses at low frequency are smaller, allowing for a single gain stage, i.e., the amplifier 5400. Operationally, an upstream signal enters the smart RF amplifier 5000 and is directed along the upstream signal flow by the diplex filter 5300. The upstream signal is equalized, attenuated, and reunited with the downstream signal via the amplifier 5400, the equalizer 5410, the attenuator 5420, and the diplex filter 5100. Attenuation and equalization are generally accomplished using plug-in components such as attenuators and equalizers, which can be varied to achieve the desired levels.

In implementations, the temperature compensation circuit 5222, the temperature compensation circuit 5252, and the temperature compensation circuit 5402 can provide temperature compensation as the attenuation of components, such as the cable, increase with higher temperatures. In certain locales or locations, without temperature compensation, amplifiers that are set up on a hot day may amplify signals beyond specified levels on a cold day, and amplifiers set up on a cold day may not amplify signals enough as the temperature rises. Signal level changes due to temperature swings are more significant in the downstream signal flow because the attenuation is greater. Downstream temperature compensation systems use a feedback control loop, which attempts to keep a specific portion of the signal at a specified power level. If the level drops the system increases the gain, and if the level increases the system lowers the gain. In the upstream signal flow, a thermal attenuator can provide some compensation without the need for a control loop.

Figure 6:
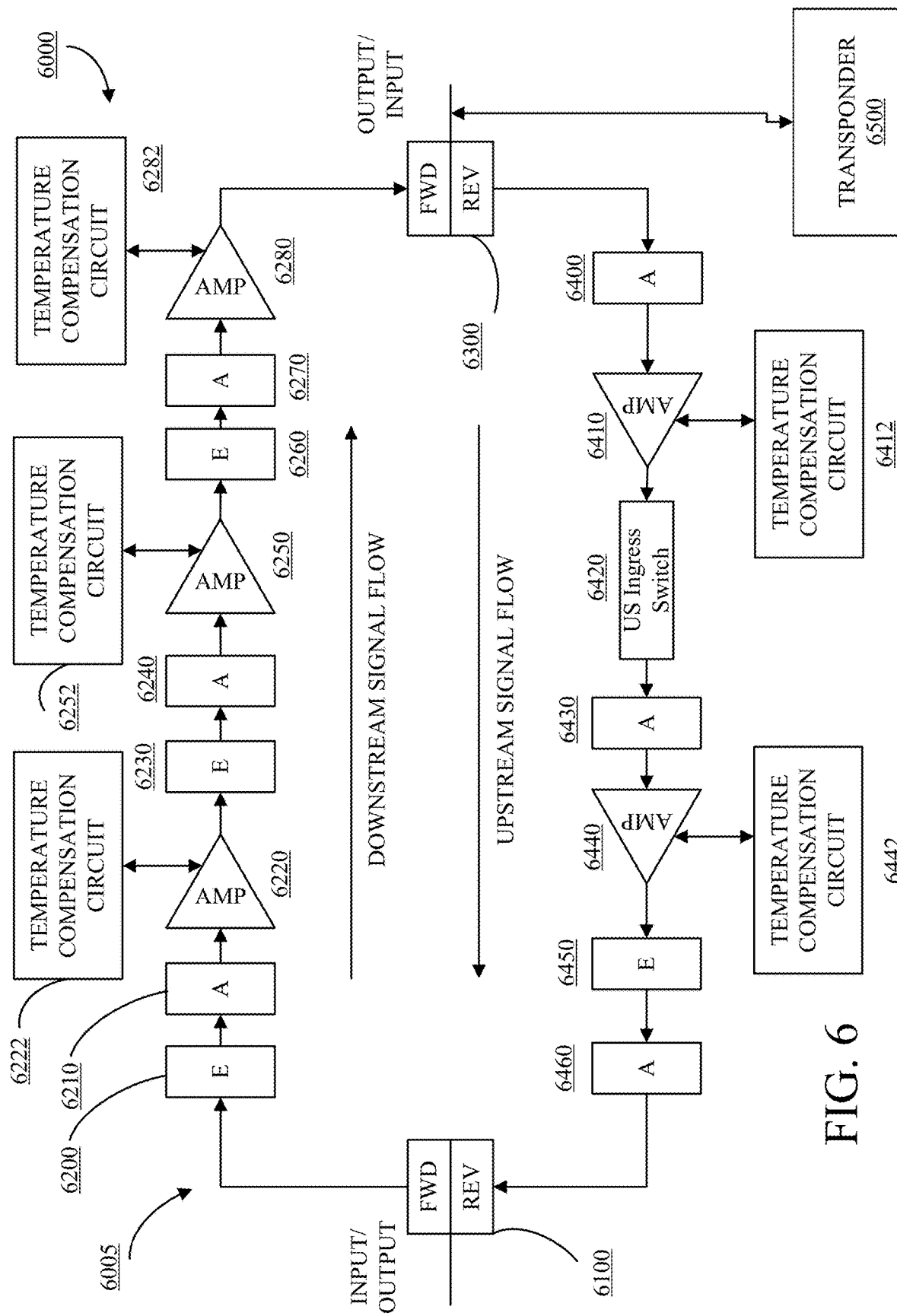
FIG. 6 is a block diagram of an example of a smart RF amplifier in accordance with embodiments of this disclosure.

FIG. 6 is a block diagram of an example of a smart RF amplifier 6000 in accordance with embodiments of this disclosure. The smart RF amplifier 6000 can be the smart amplifiers 1320, 1330, 1505, 1507, 1509, and 2000. The smart RF amplifier 6000 is a smart two-port RF amplifier configuration with multiple stages, collectively RF amplifier unit 6005, integrated with a transponder such as an OpenWrt D4.0/D3.1 modem with streaming telemetry. In this instance, the smart RF amplifier 6000 has 6 stages of equalization and attenuation blocks in the downstream signal flow, and 4 stages of equalization and attenuation blocks in the upstream signal flow. In this example, the equalization block precedes the attenuation block in the downstream direction.

The smart RF amplifier 6000 can include, but is not limited to, a diplex filter 6100 connected to a diplex filter 6300 via a downstream signal flow or path and an upstream signal flow or path. The downstream signal flow can include multiple stages which can include, but is not limited to, an equalizer 6200, an attenuator 6210, an amplifier 6220, an equalizer 6230, an attenuator 6240, an amplifier 6250, an equalizer 6260, an attenuator 6270, and an amplifier 6280. In implementations, the amplifier 6220 can be connected to a temperature compensation circuit 6222, the amplifier 6250 can be connected to a temperature compensation circuit 6252, and the amplifier 6280 can be connected to a temperature compensation circuit 6282. The upstream signal flow can include multiple stages which can include, but is not limited to, an attenuator 6400, an amplifier 6410, a switch 6420, an attenuator 6430, an amplifier 6440, an equalizer 6450, and an attenuator 6460. In implementations, the amplifier 6410 can be connected to a temperature compensation circuit 6412 and the amplifier 6440 can be connected to a temperature compensation circuit 6442. A transponder 6500 can be connected to one end or port of the smart RF amplifier 6000. The smart RF amplifier 6000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

In implementations, the equalizer 6200, the attenuator 6210, the amplifier 6220, the equalizer 6230, the attenuator 6240, the amplifier 6250, the equalizer 6260, the attenuator 6270, the amplifier 6280, the attenuator 6400, the amplifier 6410, the switch 6420, the attenuator 6430, the amplifier 6440, the equalizer 6450, and the attenuator 6460 can be controlled and/or configured by a controller such as the controller 2300, which can be connected to the transponder 6500. Configuration of each stage needs to use the values within the operating range of the stage component, i.e., the attenuator, the equalizer, the amplifier, and/or the tilt component.

In implementations, the temperature compensation circuit 6222, the temperature compensation circuit 6252, the temperature compensation circuit 6282, the temperature compensation circuit 6412, and the temperature compensation circuit 6442 can provide temperature compensation as described herein.

Operationally, a transmitted downstream signal and a transmitted upstream signal can be processed as described herein given the sequence of the stages described.

In implementations, the number of stages of components such as the equalization and attenuation components, can vary not only between the downstream and upstream signal flow, but also from one smart amplifier to another smart amplifier. This can depend on, for example, location of the smart amplifier in a cable portion of the cable or HFC network relative to a fiber node. For example, if the smart amplifier is further away from the fiber node in a cascaded amplifier link, higher downstream signal amplification may be needed compared with the upstream signal flow. In implementations, the number of ports in the smart amplifier can vary. For example, a smart amplifier can have 4 or more ports with 1 input and 3 output ports.

Operationally, the transponder, such as the transponder 5500 and/or 6500 can collect telemetry data, as described herein, from the RF amplifier unit 5005 and 6006, respectively, and stream the collected telemetry data to a service provider's streaming and analytics platform processing or service provider processing, such as the streaming and analytics platform processing or service provider processing 1240 and/or the streaming and analytics platform processing or service provider processing 1640 to detect impairments and/or faults from the transponder 5500 and/or 6500. In implementations, the service provider's streaming and analytics platform processing or service provider processing can initiate corrective measures at a determined fault site and/or location. In implementations, the service provider's streaming and analytics processing or service provider processing platform can initiate optimization and/or performance measures at the smart amplifier and/or other network components. In implementations, the service provider's streaming and analytics processing or service provider processing platform can provide instructions and/or commands based on the analyzed telemetry data to a faulty or impaired smart amplifier to remotely configure a RF amplifier unit via a controller such as the controller 2300. In implementations, the service provider's streaming and analytics processing or service provider processing platform can provide configuration instructions and/or commands based on the analyzed telemetry data to a smart amplifier to remotely optimize performance of a RF amplifier unit via a controller such as the controller 2300.

Figure 7:
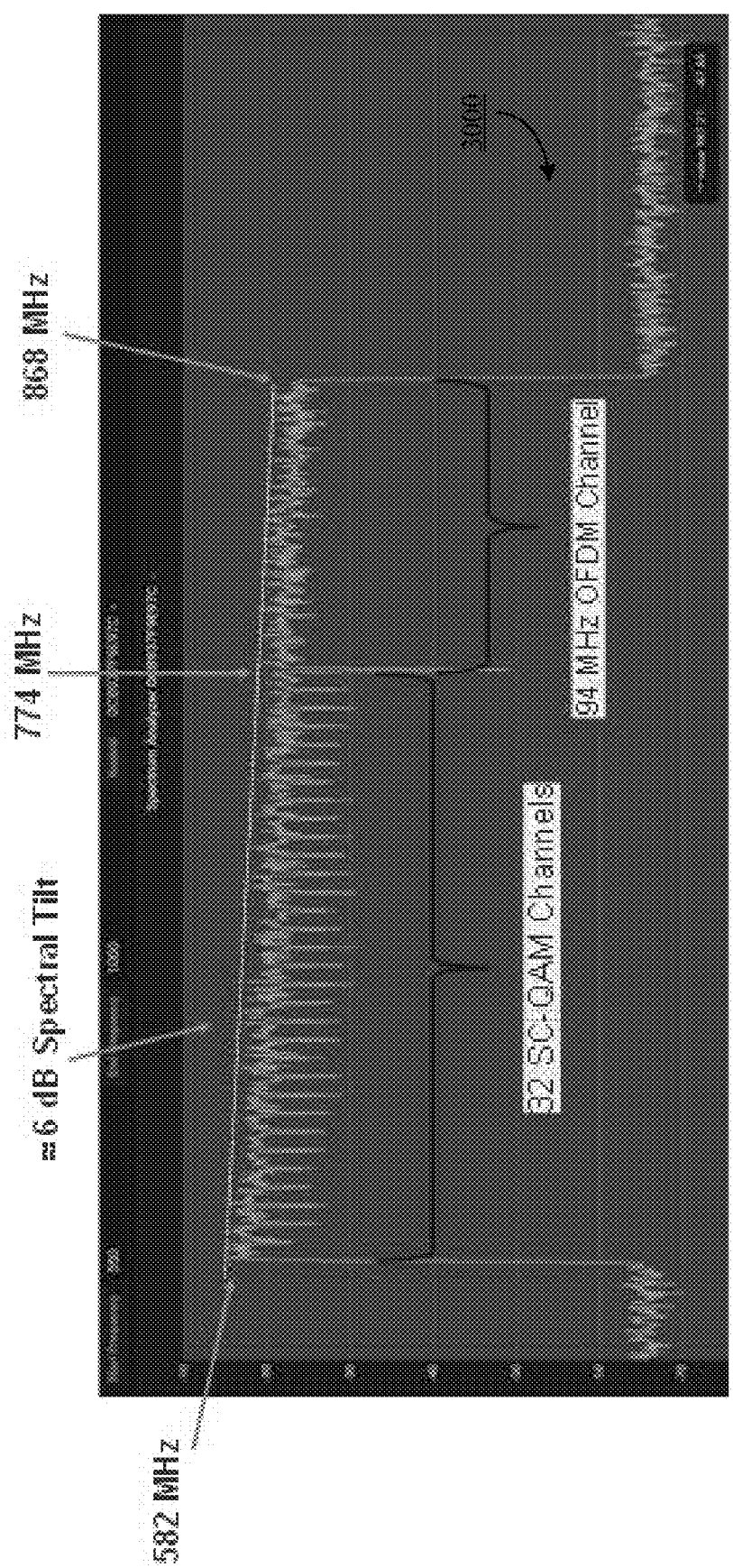
FIG. 7 is a photograph or image capture of an example of a downstream spectrum captured on a dashboard illustrating an issue in accordance with embodiments of this disclosure.

In an illustrative example, the transponder 5500 and/or 6500 can collect or capture both upstream and downstream spectrum based on defined start and end frequencies. For example, in a High-Split cable network, the upstream start and end frequencies are 5 MHz and 204 MHz. The diplexer filter transition band starts at 204 MHz up to 258 MHz. The downstream start and end frequencies are 258 MHz and 1794 MHz for a Distributed Access Architecture (DAA) deployment (as shown in FIG. 1A) with 1.8 GHz amplifiers. FIG. 7 is a photograph or image capture of an example of downstream spectrum data captured on a dashboard illustrating an issue in accordance with embodiments of this disclosure. In implementations, the downstream spectrum data shown may be captured on a Grafana dashboard. In this instance, a 6 dB downstream spectral tilt is shown with respect to 32 single carrier quadrature amplitude modulation (SC-QAM) channels and 1 OFDM channel.

In implementations, the service provider's streaming and analytics processing or service provider processing platform can include a MLM platform, such as the MLM platform 1850 in FIG. 1A, to detect any ingress, broadband noise, spectral tilt, LTE interference, or any anomaly within a respective downstream and/or upstream band. The MLM platform can analyze the received telemetry data and provide predictive analysis of the smart amplifier potential failures and how to optimize smart amplifier performance.

Figure 8:
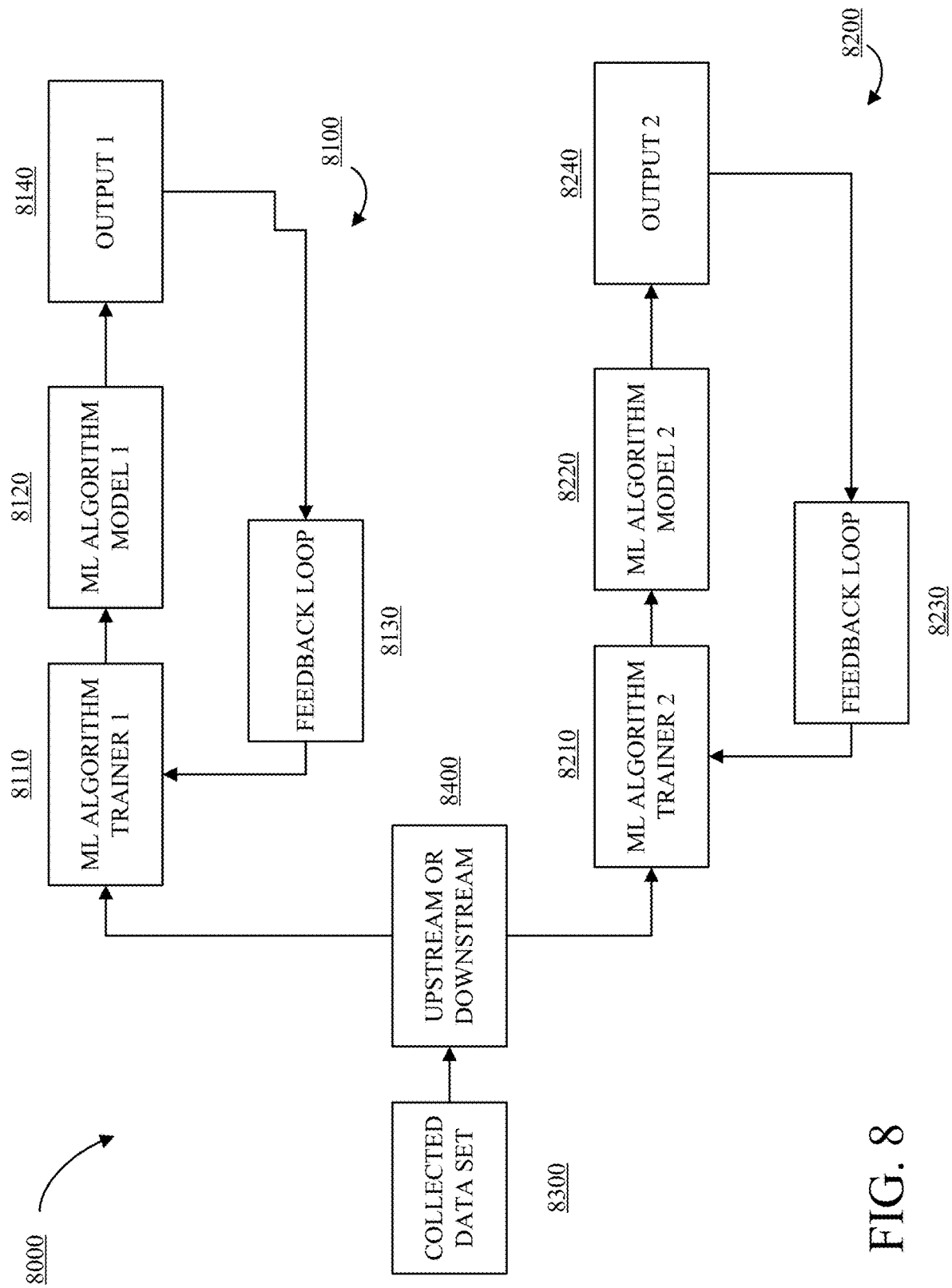
FIG. 8 is a block diagram of an example of a machine learning platform in accordance with embodiments of this disclosure.

FIG. 8 is a block diagram of an example of a MLM platform 8000 in accordance with embodiments of this disclosure. The MLM platform 8000 includes an upstream MLM platform 8100 for upstream signal flow failure detection and a downstream MLM platform 8200 for downstream signal flow failure detection. For example, the upstream MLM platform 8100 is trained to detect any ingress, broadband noise, spectral tilt or any anomaly within the upstream band and the downstream MLM platform 8200 is trained to detect any broadband noise, spectral tilt, LTE interference or any anomaly within the downstream band.

The upstream MLM platform 8100 includes a machine learning algorithm trainer 1 8110 connected to a machine learning algorithm model 1 8120 in a feedback loop 8130. The machine learning algorithm trainer 1 8110 trains the machine learning model 1 8120. The downstream MLM platform 8200 includes a machine learning algorithm trainer 2 8210 connected to a machine learning algorithm model 2 8220 in a feedback loop 8230. The machine learning algorithm trainer 2 8210 trains the machine learning model 2 8220. For example, DataRobot, which is an enterprise AI platform with automated decision intelligence, can be used to select the best training algorithm that matches the collected smart amplifier telemetry data.

The machine learning model 1 8120 and the machine learning model 2 8220 can use, for example, a decision tree algorithm, which consists of series of decisions and actions based on the continuous monitoring of the streamed telemetry data received from the field-deployed smart amplifier (8300) and filtered for the appropriate one of the upstream MLM platform 8100 and a downstream MLM platform 8200 via filter 8400 to produce an output 8140 or 8240, respectively. For example, an initial set of telemetry data can be used for selection of the machine learning model 1 8120 or machine learning model 2 8220, respectively, and training of the machine learning model 1 8120 or machine learning model 2 8220 by the machine learning algorithm trainer 1 8110 and the machine learning algorithm trainer 2 8210, respectively. Subsequent received real-time or near real-time telemetry data can be analyzed using the trained machine learning model 1 8120 or machine learning model 2 8220, which in turn sends the output to the data analytics tools 1800 of FIG. 1A, for example. The machine learning models can be used to analyze the vast amount of telemetry data from the different data analytics database to provide predictive analysis of smart amplifier field behavior and issues. Performance comparison of different smart amplifiers at different points in a cable network can be done to predict failures and/or achieve smart amplifier operational optimization.

Figure 9:
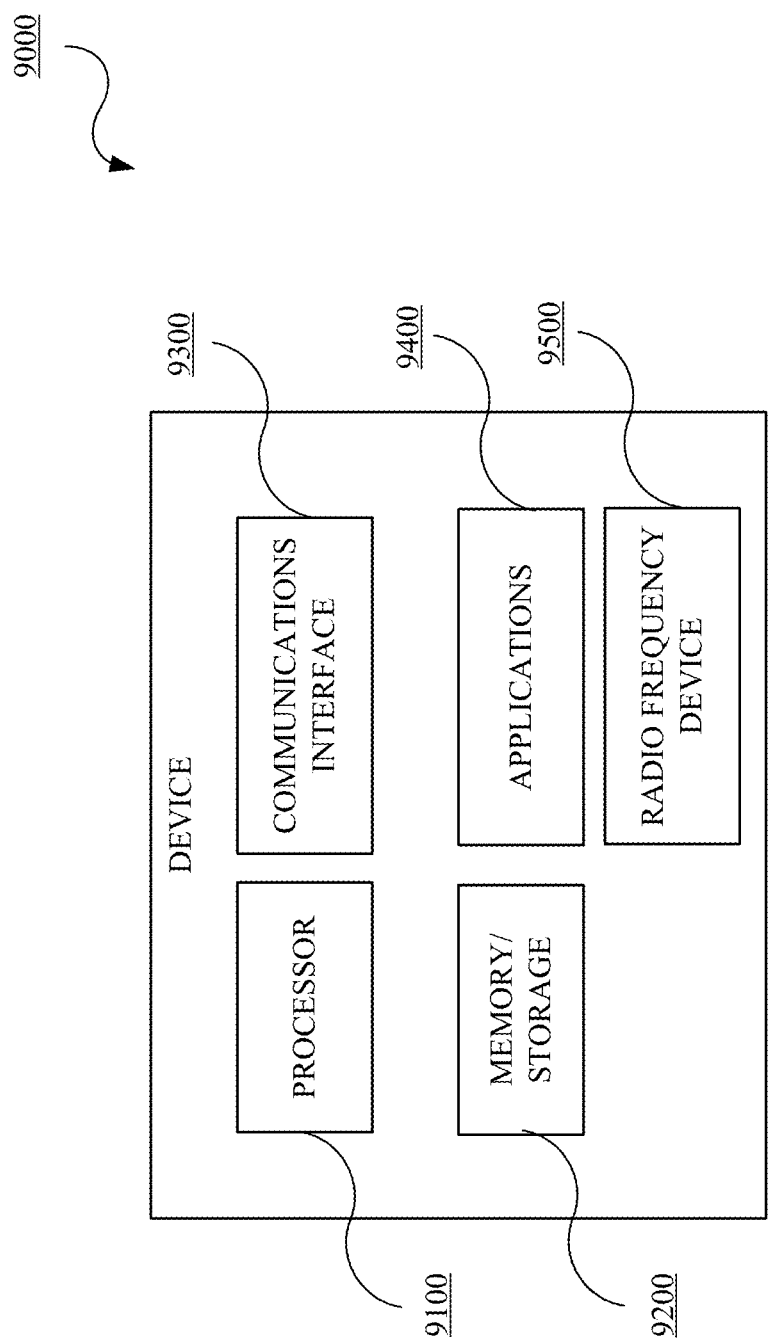
FIG. 9 is a block diagram of an example of a device in accordance with embodiments of this disclosure.

FIG. 9 is a block diagram of an example of a device 9000 in accordance with embodiments of this disclosure. The device 9000 may include, but is not limited to, a processor 9100, a memory/storage 9200, a communication interface 9300, and applications 9400. In an implementation, the device 9000 may include a radio frequency device 9500. The device 9000 may include or implement, for example, the CPE 1100, 1110, 1120, 1512, and 1514, the service provider back-office system 1200 and components therein, the smart amplifiers 1320, 1330, 1505, 1507, and 1509, the CMTS 1310, HFC network 1502 and components therein, the back office network and components therein, the network components 1520 and 1530 and components therein, the CIN 1600, the provisioning server 1620, the NMS 1610, the service provider network 1630 and components therein, the service provider streaming and analytics processing or service provider processing platform and/or server 1640 and components therein, the smart amplifier 2000 and components therein, the smart amplifier 5000 and components therein, and the smart amplifier 6000 and components therein. The applicable or appropriate techniques or methods described herein may be stored in the memory/storage 9200 and executed by the processor 9100 in cooperation with the memory/storage 9200, the communications interface 9300, the applications 9400, and the radio frequency device 9500 (when applicable), as appropriate. The device 9000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 10:
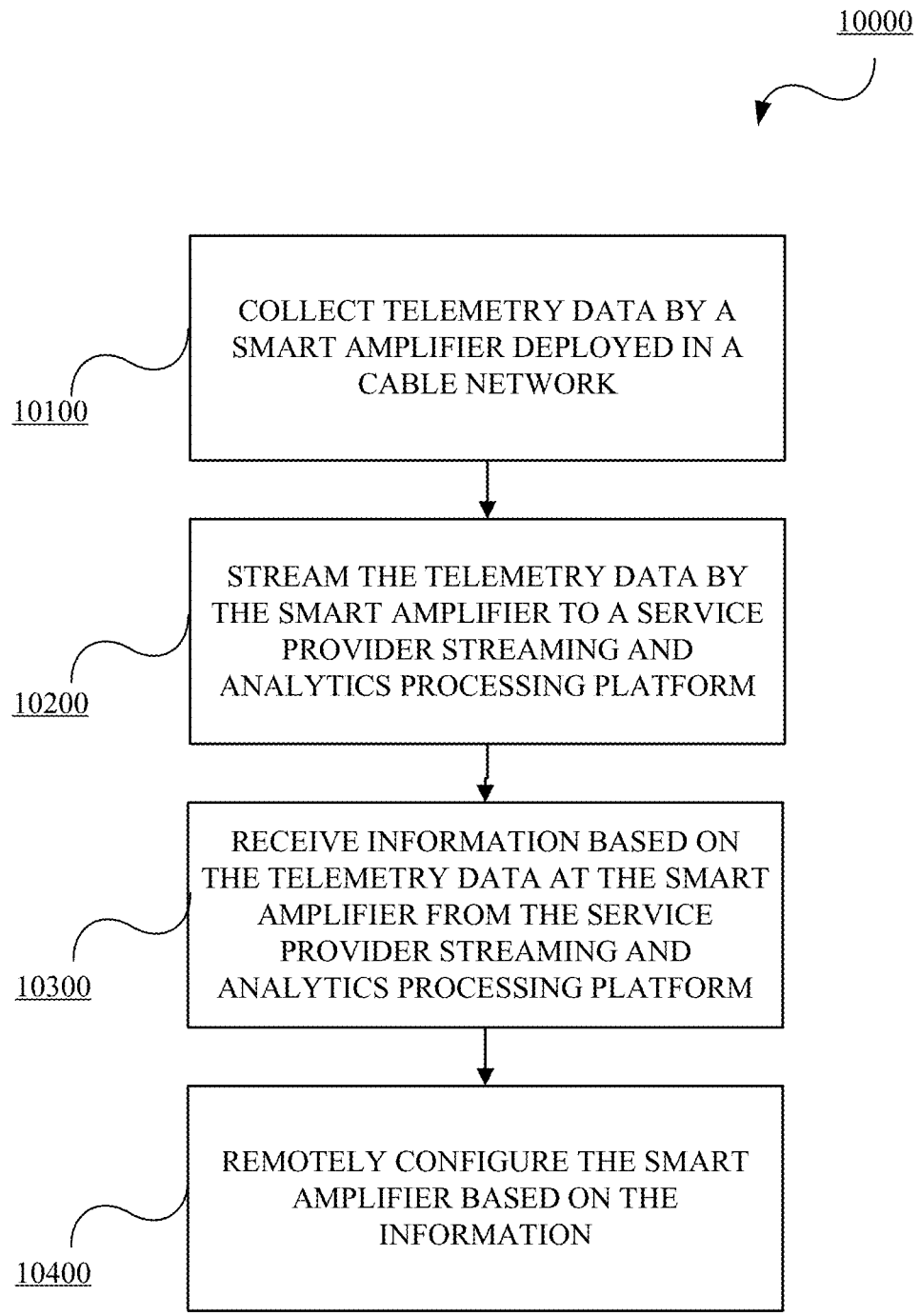
FIG. 10 is a flowchart of an example method for remote monitoring of a smart RF amplifier in accordance with embodiments of this disclosure.

FIG. 10 is a flowchart of an example method 10000 for remote monitoring and configuration of a smart RF amplifier in accordance with embodiments of this disclosure. The method 10000 includes collecting 10100 telemetry data by a smart amplifier deployed in a cable network; streaming 10200 the telemetry data by the smart amplifier to a service provider streaming and analytics processing or service provider processing platform; receiving 10300 information based on the telemetry data at the smart amplifier from the service provider streaming and analytics processing or service provider processing platform; and remotely configuring 10400 the smart amplifier based on the information. The method 10000 can be implemented, for example, in the CPE 1100, 1110, 1120, 1512, and 1514, the service provider back-office system 1200 and components therein, the smart amplifiers 1320, 1330, 1505, 1507, and 1509, the CMTS 1310, HFC network 1502 and components therein, the back office network and components therein, the network components 1520 and 1530 and components therein, the CIN 1600, the provisioning server 1620, the NMS 1610, the service provider network 1630 and components therein, the service provider streaming and analytics processing or service provider processing platform and/or server 1640 and components therein, the smart amplifier 2000 and components therein, the smart amplifier 5000 and components therein, and the smart amplifier 6000 and components therein, the device 9000, the processor 9100, the memory/storage 9200, the communications interface 9300, the applications 9400, and the radio frequency device 9500 when available, as appropriate and applicable.

The method includes collecting 10100 telemetry data by a smart amplifier deployed in a cable network. Smart amplifiers are deployed on a cable network, such as a hybrid fiber-coaxial (HFC) network or other cable access network. The smart amplifiers each include at least a RF amplifier unit, a controller, and a transponder which includes a transponder component and a telemetry agent. The smart amplifier receives upstream and/or downstream signal flow over the HFC network or other cable access network. The transponder component of the transponder samples, processes, and digitizes upstream and/or downstream signal flow at the smart amplifier to provide or collect telemetry data regarding the smart amplifier, the HFC network, and/or other network components on the HFC network. The telemetry data includes data as described herein.

The method includes streaming 10200 the telemetry data by the smart amplifier to a service provider streaming and analytics processing or service provider processing platform. The telemetry agent collects and streams the telemetry data to a service provider back-office network which includes the service provider streaming and analytics processing or service provider processing platform.

The method includes receiving 10300 information based on the telemetry data at the smart amplifier from the service provider streaming and analytics processing or service provider processing platform. The service provider streaming and analytics processing or service provider processing platform analyzes the telemetry data as described herein using, for example, MLM platforms as described herein. The service provider streaming and analytics processing or service provider processing platform can initiate correction and/or optimization actions in view of the analyzed telemetry data. In implementations, the service provider streaming and analytics processing or service provider processing platform can transmit information such as configuration commands, configuration instructions, or configuration files to configure smart amplifiers, the HFC network, and/or other network components on the HFC network. For example, the configuration files are updated configuration files which were updated based on the telemetry data. The updated configuration file may be sent to the controller to optimize the performance of each amplifier stage in the RF amplifier unit.

The method includes remotely configuring 10400 the smart amplifier based on the command. The controller can configure the smart amplifier, such as the RF amplifier unit or components therein as described herein, to correct and/or optimize operation of the smart amplifier based on the command.

Described herein are devices, systems, and methods for remote configuration and monitoring of smart amplifiers in cable systems. In implementations, a smart amplifier includes a radio frequency (RF) amplifier unit, a transponder, and a controller. The RF amplifier unit is configured to process a signal received via a cable access network. The transponder is configured to collect telemetry data from the received signal and stream the collected telemetry data to a service provider streaming and analytics processing or service provider processing platform. The controller is configured to remotely configure the RF amplifier unit based on information received from the service provider streaming and analytics processing or service provider processing platform, the information based on the streamed telemetry data.

In implementations, the transponder further includes a transponder component; and a telemetry agent integrated with the transponder component, where the transponder component and the telemetry agent collectively collect the telemetry data from the received signal, and where the transponder component and the telemetry agent collectively stream the collected telemetry data to the service provider streaming and analytics processing or service provider processing platform. In implementations, the transponder is further configured to execute scripts to collect the telemetry data from the received signal. In implementations, the controller is further configured to execute scripts with the transponder to configure the RF amplifier unit based on the information received from the service provider streaming and analytics processing or service provider processing platform. In implementations, the transponder includes at least a cable modem integrated with a telemetry agent. In implementations, the transponder includes at least a spectrum analyzer component integrated with a telemetry agent. In implementations, the transponder further includes a location component configured to provide a location of the smart amplifier in the HFC network. In implementations, the location component is a Global Positioning System type component. In implementations, the location component is a location management information base object.

In implementations, a system includes a service provider streaming and analytics processing platform, a cable access network configured to carry signals, and a plurality of smart amplifiers deployed on and connected to the cable access network. Each smart amplifier includes a radio frequency (RF) amplifier unit configured to process a signal received via the cable access network, and a transponder configured to collect telemetry data from the received signal; and stream the collected telemetry data to the service provider streaming and analytics processing or service provider processing platform, where the service provider streaming and analytics processing or service provider processing platform is configured to initiate an action based on an analysis of the streamed telemetry data.

In implementations, the service provider streaming and analytics processing or service provider processing platform is configured to transmit information based on the analysis of the streamed telemetry data, wherein each smart amplifier further comprises a controller, and wherein the controller is configured to remotely configure the RF amplifier unit based on the information. In implementations, each transponder further include a transponder component; and a telemetry agent integrated with the transponder component, where each smart amplifier further includes a controller, and where the controller, the transponder component and the telemetry agent collectively collect the telemetry data from the received signal, and where the transponder component and the telemetry agent collectively stream the collected telemetry data to the service provider streaming and analytics processing or service provider processing platform. In implementations, the transponder is further configured to execute scripts to collect the telemetry data from the signal and stream the collected telemetry data to the service provider streaming and analytics processing or service provider processing platform. In implementations, each smart amplifier further includes a controller configured to execute scripts with the transponder to configure the RF amplifier unit based on commands received from the service provider streaming and analytics processing or service provider processing platform. In implementations, the transponder includes at least a cable modem integrated with a telemetry agent. In implementations, the transponder includes at least a spectrum analyzer component integrated with a telemetry agent. In implementations, the service provider streaming and analytics processing or service provider processing platform further includes a first machine learning platform configured to analyze upstream telemetry data from the streamed telemetry data to provide predictive analysis of smart amplifier and cable access network potential impairments and optimize performance, and a second machine learning platform configured to analyze downstream telemetry data from the streamed telemetry data to provide predictive analysis of smart amplifier and cable access network potential impairments and optimize performance.

In implementations, a method for remote monitoring and configuration of a smart amplifier, the method includes collecting, by a transponder of a smart amplifier deployed in a cable access network, telemetry data, streaming, by the transponder, the telemetry data to a service provider streaming and analytics processing or service provider processing platform, receiving, by a controller at the smart amplifier from the service provider streaming and analytics processing or service provider processing platform, information based on the telemetry data, and remotely configuring, by the controller, a radio frequency amplifier at the smart amplifier based on the information.

In implementations, the method further includes executing, by the transponder, a script to collect the telemetry data from the radio frequency amplifier and stream the telemetry data to the service provider streaming and analytics processing or service provider processing platform, and executing, by the controller, a script to configure the radio frequency amplifier based on the command from the service provider streaming and analytics processing or service provider processing platform. In implementations, the method further includes analyzing, by a first machine learning platform, upstream telemetry data from the streamed telemetry data to provide predictive analysis of smart amplifier and cable network potential impairments and optimize performance, and analyzing, by a second machine learning platform, downstream telemetry data from the streamed telemetry data to provide predictive analysis of smart amplifier and cable access network potential impairments and optimize performance.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A smart amplifier, comprising:
    a radio frequency (RF) amplifier unit configured to process a signal received via a cable access network;
    a transponder configured to:
        collect telemetry data from the received signal; and
        stream the collected telemetry data to a service provider processing platform; and
    a controller configured to remotely configure the RF amplifier unit based on information received from the service provider processing platform, the information based on the streamed telemetry data.

2. The smart amplifier of claim 1, wherein the transponder further comprises:
    a transponder component; and
    a telemetry agent integrated with the transponder component,
    wherein the transponder component and the telemetry agent collectively collect the telemetry data from the received signal, and
    wherein the transponder component and the telemetry agent collectively stream the collected telemetry data to the service provider processing platform.

3. The smart amplifier of claim 1, wherein the transponder is further configured to execute scripts to collect the telemetry data from the received signal.

4. The smart amplifier of claim 3, wherein the controller is further configured to execute scripts with the transponder to configure the RF amplifier unit based on the information received from the service provider processing platform.

5. The smart amplifier of claim 1, wherein the transponder includes at least a cable modem integrated with a telemetry agent.

6. The smart amplifier of claim 1, wherein the transponder includes at least a spectrum analyzer component integrated with a telemetry agent.

7. The smart amplifier of claim 1, wherein the transponder further comprises:
    a location component configured to provide a location of the smart amplifier in the cable access network.

8. The smart amplifier of claim 7, wherein the location component is a Global Positioning System type component.

9. The smart amplifier of claim 7, wherein the location component is a location management information base object.

10. A system, comprising:
    a service provider processing platform;
    a cable access network configured to carry signals; and
    a plurality of smart amplifiers deployed on and connected to the cable access network, each smart amplifier comprising:
        a radio frequency (RF) amplifier unit configured to process a signal received via the cable access network; and
        a transponder configured to:
            collect telemetry data from the received signal; and
            stream the collected telemetry data to the service provider processing platform,
    wherein the service provider processing platform is configured to initiate an action based on an analysis of respective streamed telemetry data.

11. The system of claim 10, wherein the service provider processing platform is configured to transmit respective information based on the analysis of the respective streamed telemetry data, wherein each smart amplifier further comprises a controller, and wherein the controller is configured to remotely configure the RF amplifier unit based on the respective information.

12. The system of claim 10, wherein each transponder further comprises:
    a transponder component; and
    a telemetry agent integrated with the transponder component,
    wherein each smart amplifier further comprises a controller, and wherein the controller, the transponder component and the telemetry agent collectively collect the telemetry data from the received signal, and wherein the transponder component and the telemetry agent collectively stream the collected telemetry data to the service provider processing platform.

13. The system of claim 10, wherein the transponder is further configured to execute scripts to collect the telemetry data from the signal and stream the collected telemetry data to the service provider processing platform.

14. The system of claim 10, wherein each smart amplifier further comprises a controller configured to execute scripts with the transponder to configure the RF amplifier unit based on commands received from the service provider processing platform.

15. The system of claim 10, wherein the transponder includes at least a cable modem integrated with a telemetry agent.

16. The system of claim 10, wherein the transponder includes at least a spectrum analyzer component integrated with a telemetry agent.

17. The system of claim 10, wherein the service provider processing platform further comprises:

a first machine learning platform configured to analyze upstream telemetry data from the respective streamed telemetry data to provide predictive analysis of smart amplifier and cable access network potential impairments and optimize performance; and a second machine learning platform configured to analyze downstream telemetry data from the respective streamed telemetry data to provide predictive analysis of smart amplifier and cable access network potential impairments and optimize performance.

18. A method for remote monitoring and configuration of a smart amplifier, the method comprising:

collecting, by a transponder of a smart amplifier deployed in a cable access network, telemetry data;

streaming, by the transponder, the telemetry data to a service provider processing platform;

receiving, by a controller at the smart amplifier from the service provider processing platform, information based on the telemetry data; and remotely configuring, by the controller, a radio frequency amplifier at the smart amplifier based on the information.

19. The method of claim 18, further comprising:

executing, by the transponder, a script to collect the telemetry data from the smart amplifier and stream the telemetry data to the service provider processing platform; and executing, by the controller, a script to configure the radio frequency smart amplifier based on the information from the service provider processing platform.

20. The method of claim 19, further comprising:

analyzing, by a first machine learning platform, upstream telemetry data from the streamed telemetry data to provide predictive analysis of smart amplifier and cable network potential impairments and optimize performance; and analyzing, by a second machine learning platform, downstream telemetry data from the streamed telemetry data to provide predictive analysis of smart amplifier and cable access network potential impairments and optimize performance.

* * * * *